Nov. 25, 1924.
W. K. BEVERIDGE
1,516,663
APPARATUS FOR DRYING SHEETS OF EDIBLE GELATIN
Filed Sept. 14 1923
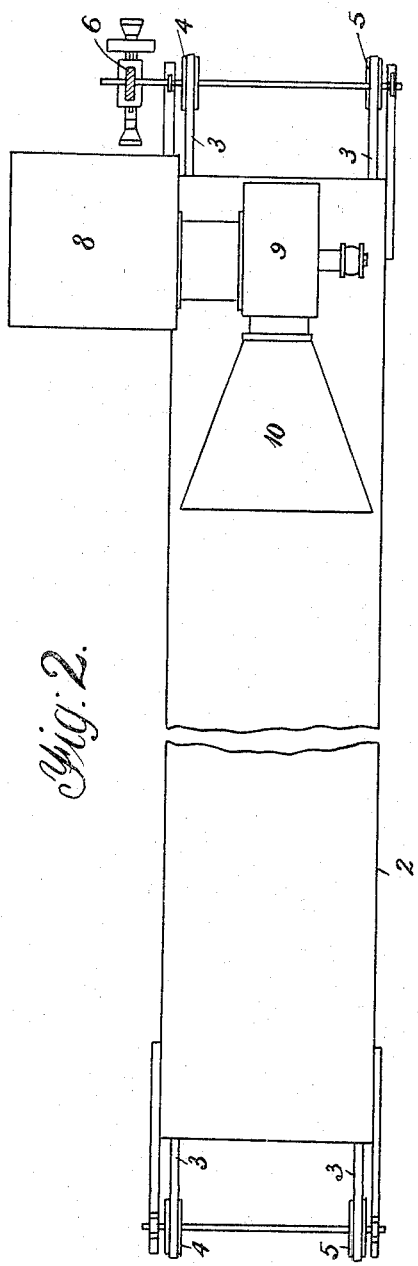
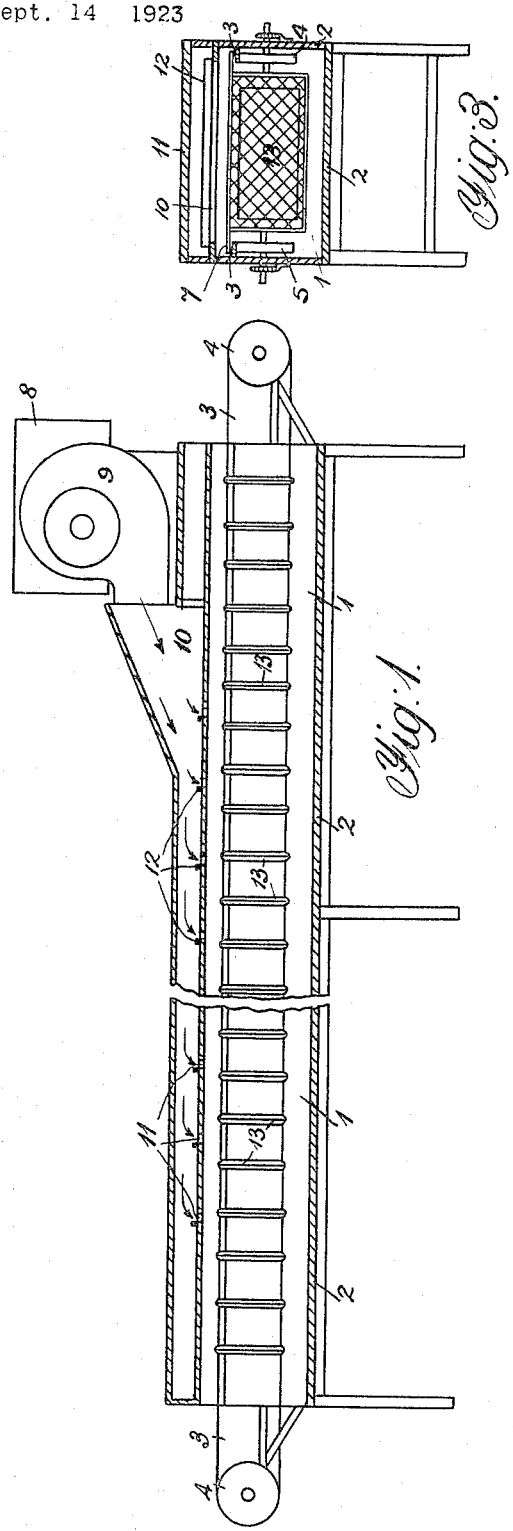
INVENTOR.
William Keir Beveridge.
by Arthur J. Stephens
Attorney.

Patented Nov. 25, 1924.

1,516,663

UNITED STATES PATENT OFFICE.

WILLIAM KEIR BEVERIDGE, OF WARWICK, ENGLAND, ASSIGNOR TO GEORGE NELSON, DALE & COMPANY, LIMITED, OF WARWICK, ENGLAND.

APPARATUS FOR DRYING SHEETS OF EDIBLE GELATIN.

Application filed September 14, 1923. Serial No. 662,783.

*To all whom it may concern:*

Be it known that I, WILLIAM KEIR BEVERIDGE, a subject of the King of Great Britain and Ireland, residing at Westbury House, Coten End, Warwick, in the county of Warwick, England, have invented new and useful Improvements in Apparatus for Drying Sheets of Edible Gelatin, of which the following is a specification.

The present invention relates to apparatus for manufacturing crinkled sheets of edible gelatin, produced by the process described in general in my company's Patent No. 1,347,226. In that process, dry gelatin sheets are enclosed in a crinkling frame dipped in water and left to dry either in the atmosphere or under the action of a blower. The present invention provides apparatus for rapidly drying the sheets, and a construction embodying the invention is shown in the accompanying drawings, in which—

Figure 1 is a longitudinal section of the apparatus.

Figure 2 is a plan view of Figure 1, and

Figure 3 is a transverse section of the apparatus.

The apparatus comprises a tunnel 1 carried in a suitable frame 2. A pair of endless belts 3 are respectively arranged on each side of the interior of the tunnel, these belts passing over pulleys 4 and 5 mounted at each end of the tunnel. The pulleys 4 are driven from any suitable power source through a gear 6 at a fairly low speed. The crinkling frames 13 are of similar form to those described in Patent No. 1,347,226, having end extensions 7, which rest on the belts 3, so that the frames pass in a vertical position through the tunnel 1. Hot air is supplied to the interior of the tunnel in the following manner: Air is drawn through a heater, diagrammatically shown at 8, by a fan 9 and is supplied to a distributor 10 on top of the tunnel 1. Slots 11 are provided for the air to reach the interior of the tunnel and behind each slot is a baffle 12 which catches the air and ensures delivery through the slot.

In use, the crinkling frames 13 are respectively filled with a sheet of gelatin and dipped and then placed in position one after another, on the belts 3 so that they pass through the tunnel, the hot air delivered through the slots 11 drying the gelatin. The frames finally emerge at the end of the tunnel 1 and are removed. The speed of the belts, the delivery of air, and length of the tunnel, are determined so that the sheets are just dry when the frames emerge.

It will be readily understood that considerable variations in detail may be made without exceeding the scope of the invention.

What I claim is:—

1. Apparatus for drying sheets of edible gelatin held in frames, comprising a tunnel, means for traversing the frames through said tunnel, an air fan mounted on said tunnel, and a slotted air distributor mounted on said tunnel for supplying a series of air jets to the interior thereof.

2. Apparatus for drying sheets of edible gelatin held in frames, comprising a tunnel, parallel endless bands for carrying the frames traversing said tunnel, pulleys supporting said bands mounted at the ends of said tunnel, an air fan mounted on said tunnel, and a slotted air distributor mounted in said tunnel for supplying a series of air jets to the interior thereof.

3. Apparatus for drying sheets of edible gelatin held in frames, comprising a tunnel, parallel endless bands for carrying the frames traversing said tunnel, pulleys supporting said bands mounted at the ends of said tunnel, an air fan mounted on said tunnel, a slotted air distributor mounted on said tunnel, and baffles mounted in said distributor for directing air in a series of jets through the slots to the interior of said tunnel.

4. Apparatus for drying sheets of edible gelatin held in frames, comprising a tunnel, parallel endless bands for carrying the frames traversing said tunnel, pulleys supporting said bands mounted at the ends of said tunnel, an air heater mounted on said tunnel, an air fan supplied by said heater mounted on said tunnel, and a slotted distributor mounted in said tunnel for supplying a series of air jets to the interior thereof.

5. Apparatus for drying sheets of edible gelatin held in frames, comprising a tunnel, parallel endless bands for carrying the frames traversing said tunnel, pulleys supporting said bands mounted at the ends of said tunnel, an air heater mounted on said tunnel, an air fan supplied by said heater mounted on said tunnel, a slotted air distributor mounted on said tunnel, baffles mounted in said distributor for directing air in a series of jets through the slots to the interior of said tunnel.

In witness whereof I have signed my name to this specification.

WILLIAM KEIR BEVERIDGE.